United States Patent [19]

Sasaki et al.

[11] Patent Number: 5,009,478
[45] Date of Patent: Apr. 23, 1991

[54] METHOD FOR THE MANUFACTURE OF AN OPTICAL FIBER COUPLER

[75] Inventors: Hiroyuki Sasaki, Hachiouji; Masato Shimamura, Sagamihara; Juichi Noda, Mito; Hiroaki Hanafusa, Mito; Yoshiaki Takeuchi, Mito, all of Japan

[73] Assignees: Japan Aviation Electronics Industry Limited; Nippon Telegraph and Telephone Corporation, both of Tokyo, Japan

[21] Appl. No.: 432,935

[22] Filed: Nov. 7, 1989

[30] Foreign Application Priority Data

Nov. 18, 1988 [JP] Japan ................. 63-292139

[51] Int. Cl.$^5$ ............ G02B 6/26; C03B 23/20
[52] U.S. Cl. .................. 350/96.15; 350/320; 65/4.2
[58] Field of Search ............ 350/96.15, 96.16, 320; 65/3.11, 4.2, 4.21, 36

[56] References Cited

U.S. PATENT DOCUMENTS

| 4,763,272 | 8/1988 | McLandrich | 350/96.15 |
| 4,765,816 | 8/1988 | Bjornlie et al. | 65/4.2 |
| 4,869,570 | 9/1989 | Yokohama et al. | 350/96.15 |
| 4,902,323 | 2/1990 | Miller et al. | 350/96.15 X |
| 4,902,324 | 2/1990 | Miller et al. | 65/3.11 |
| 4,915,467 | 4/1990 | Berkey | 350/96.15 |
| 4,923,268 | 5/1990 | Xu | 350/96.15 |
| 4,948,217 | 8/1990 | Keck et al. | 350/96.15 |

FOREIGN PATENT DOCUMENTS

| 8304409 | 12/1983 | PCT Int'l Appl. | 350/96.15 X |
| 2179171 | 2/1987 | United Kingdom | 350/96.15 X |

Primary Examiner—Brian Healy
Attorney, Agent, or Firm—Pollock, Vande Sande and Priddy

[57] ABSTRACT

In a method of making an optical fiber coupler through heat elongation of optical fibers, the performance of the coupled optical fibers is measured after the optical fibers are heat elongated at least once, and based on the measured elongation length and the performance of the coupled optical fibers, a functional equation representing their relationship is determined by approximate calculation. The functional equation is used to calculate an elongation length which provides the intended performance of the coupled optical fibers, and then the optical fibers are heat elongated to the calculated length.

5 Claims, 1 Drawing Sheet

METHOD FOR THE MANUFACTURE OF AN OPTICAL FIBER COUPLER

BACKGROUND OF THE INVENTION

The present invention relates to a method of making an optical fiber coupler by use of a fusion-elongation method.

In the fabrication of an optical fiber coupler by use of the fusion-elongation method, a variation in the elongation length of optical fibers, even if very slight, brings about a substantial change in the performance (a branching ratio or isolation, hereinafter identified as the branching ratio) of the optical fiber coupler. To obtain an optical fiber coupler of the desired performance, it is a general practice in the prior art to repeat measurement of the branching ratio upon each occurrence of an extremely slight change in the elongation length until the intended branching ratio is attained. Such a manufacturing method is very timeconsuming for the reasons given below.

Optical fibers must be heated for their elongation; this heating produces a change in the property of the optical fibers, causing the performance of the optical fiber coupler to vary. The optical fiber coupler exhibits its true performance in a heat-free condition; therefore, the performance of the optical fiber coupler must be checked, with the heat source held apart therefrom. In the conventional manufacturing process it is necessary to repeat checking of the performance of the optical fiber coupler being manufactured and the elongation of the optical fibers until the intended performance will have been obtained. This repetitive work consumes an appreciable amount of time in the fabrication of the optical fiber coupler.

SUMMARY OF THE INVENTION

It is therefore an obJect of the present invention to provide an optical fiber coupler manufacturing method which permits the fabrication of an optical fiber coupler of the desired performance in a short time.

According to the present invention, the performance of the optical fiber coupler is measured after optical fibers are heat elongated at least once, and a functional equation representing the relationship between the elongation length and the performance of the optical fiber coupler is determined by an approximate calculation. The functional equation is used to calculate the elongation length which provides the intended performance of the optical fiber coupler, and then the optical fibers are heat elongated again to the elongation length thus calculated.

DESCRIPTION OF THE PREFERRED EMBODIMENT

Figure 1:
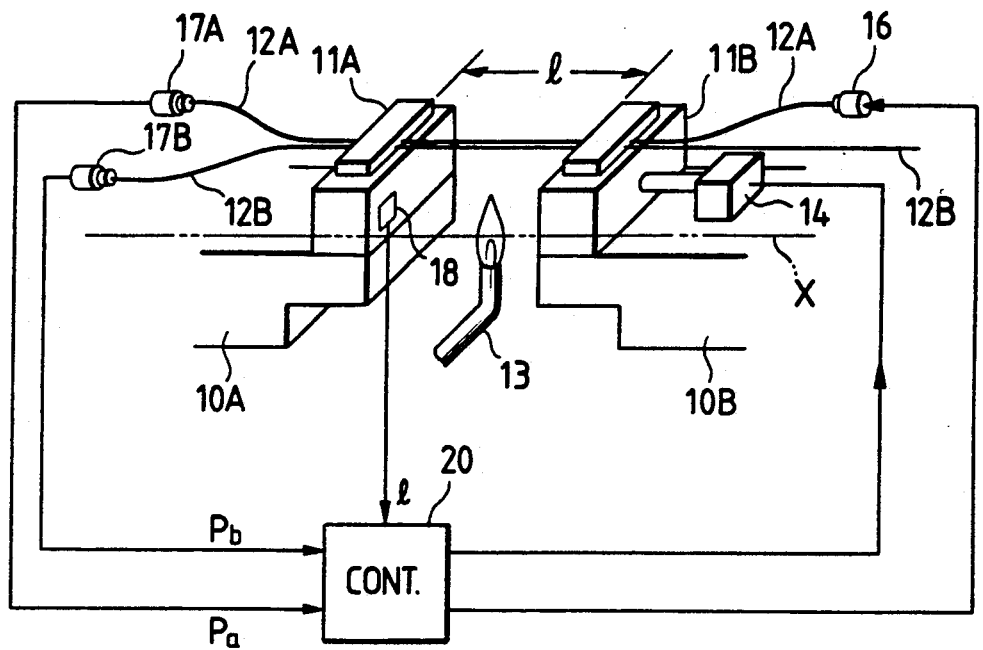
FIG. 1 is a diagram schematically illustrating an example of apparatus embodying the present invention.

FIG. 1 illustrates an example of apparatus for the manufacture of an optical fiber coupler according to the present invention. The optical fiber coupler is produced by fusion welding two optical fibers over a very short length and elongating the welded portion to obtain the desired optical branching ratio. As shown in FIG. 1, for example, a pair of opposed bases 10A and 10B are disposed on the X axis. The base 10A has a mount 11A fixedly disposed thereon and the other base 10B has a mount 11B disposed thereon in a manner to be slidable in the X-axis direction. Two optical fibers 12A and 12B are fixed onto the mounts 11A and 11B while being held side by side. A driver 14 pulls the mount 11B with constant force, sliding it by a desired distance along the X axis in the direction reverse from the mount 11A. Disposed between the bases 10A and 10B is a burner 13 by which the optical fibers 12A and 12B are heated and fusion welded with each other.

The optical fiber 12A has attached thereto at one end a light emitting diode, laser diode, or similar light source 16 and at the other end a photodetector 17A. The optical fiber 12B has also attached thereto a photodetector 17B at one end on the same side as the photodetector 17A. A distance measuring element 18 for measuring the distance $\lambda$ between the mounts 11A and 11B is mounted on the side of the mount 11A facing toward the mount 11B.

A controller 20 controls movement of the driver 14 and supplies drive power to the light source 16. Further, the controller 20 calculates the branching ratio $y = Pb/(Pa + Pb)$ from electrical signals Pa and Pb corresponding to the quantities of light (power) detected by the photodetectors 17A and 17B and an elongation length $\Delta\lambda = \lambda - \lambda_0$ (where $\lambda_0$ is an initial value of the length $\lambda$) of each of the optical fibers 12A and 12B from a length signal $\lambda$ received from the distance measuring element 18 and performs an approximate calculation based on the calculated results to obtain a function which represents the relationship between the elongation length $\Delta\lambda$ and the branching ratio y in accordance with the method of the present invention.

According to the present invention, the optical fiber coupler is manufactured using the following procedure.

Step (1): At first, the initial value $\lambda_0$ of the distance between the mounts 11A and 11B is measured by the distance measuring element 18 and is stored in the controller 20. Light is entered into the optical fiber 12A from the light source 16 and the optical fibers 12A and 12B are fusion welded with each other through heating by the burner 13 and the mount 11B is pulled by the driver 14 with constant force while the controller 20 monitors the output from the photodetector 17A, for instance. The quantity of light detected by the photodetector 17A remains constant even after the fusion-welded portion of the optical fibers 12A and 12B starts to be elongated, but when the elongation length $\Delta\lambda$ exceeds a certain value, the output of the photodetector 17A begins to decrease.

Step (2): At the time point when the output Pa of the photodetector 17A decreases from its initial value by a first percentage value sufficiently smaller than the branching ratio desired to obtain, the burner 13 is moved out of its heating position to stop heating of the optical fibers 12A and 12B and at the same time the movement of the mount 11B is stopped. The controller 20 calculates and stores a first branching ratio $y_1 = Pa/(Pa + Pb)$ based on the outputs of the photodetectors 17A and 17B measured after the temperature of the fusion-welded portion of the optical fibers 12A and 12B has dropped substantially to room temperature. Moreover, the controller 20 calculates and stores a first elongation length $\Delta\lambda_1 = \lambda_1 - \lambda_0$ based on the initial value $\lambda_0$ and the output $\lambda_1$ of the distance measuring element 18 measured at the position where the mount 11B was stopped.

Step (3): As in Step (2), at the time point when the output of the photodetector 17A decreases from the initial value by a second percentage value smaller than the desired branching ratio as the heat elongation of the optical fibers 12A and 12B proceeds, the burner 13 is brought out of its heating position to stop heating of the optical fibers 12A and 12B, and at the same time, pulling of the mount 11B by the driver 14 is stopped. The controller 20 calculates and stores a second branching ratio $y_2$ based on the outputs of the photodetectors 17A and 17B measured after the temperature of the fusion-welded portion of the optical fibers 12A and 12B dropped down to substantially room temperature and a second elongation length $\Delta\lambda_2 = \lambda_2 - \lambda_0$ at that time.

Step (3) is repeated, as required, to obtain a desired number of branching ratios $y_1$, $y_2$, ... and elongation lengths $\Delta\lambda_1$, $\Delta\lambda_2$, ... corresponding thereto.

Step (4): Based on the elongation length data $\Delta\lambda_1$, $\Delta\lambda_2$, ... and the branching ratios $y_1$, $y_2$, ... obtained as mentioned above, the controller 20 determines, through an approximate calculation, a functional equation representing the branching ratio of the optical fiber coupler as a function of the elongation length.

Figure 2:
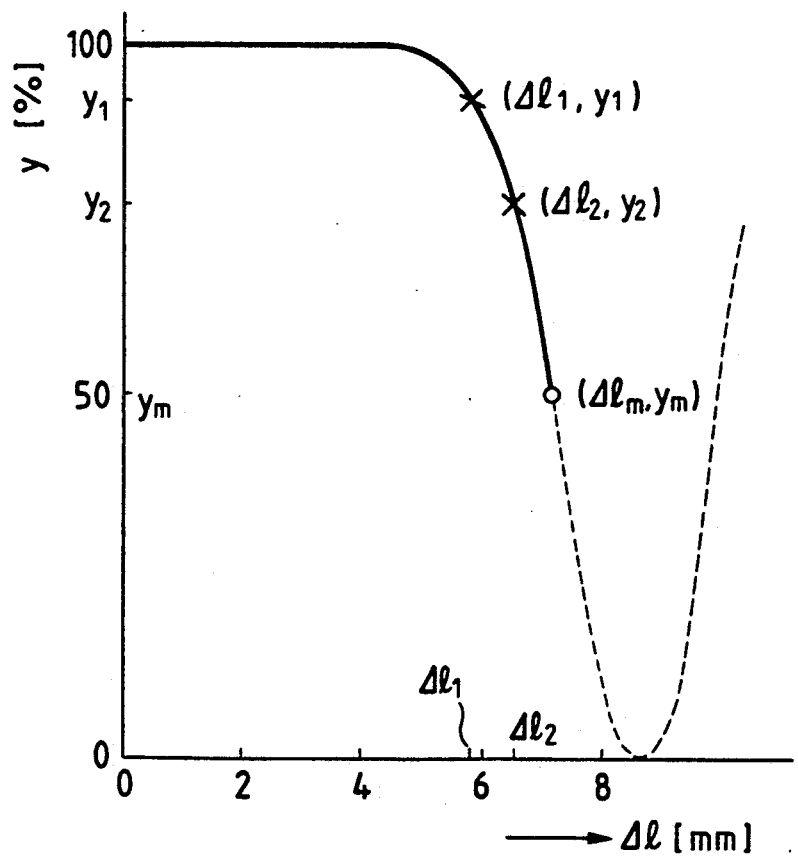
FIG. 2 is a graph showing the points of measurement of the elongation length and the branching ratio and a functional equation calculated based on the points of measurement.

As the fusion-welded portion of the optical fibers elongates in excess of a certain value, the branching ratio y at the light emitting end of the optical fiber coupler repeats to decrease sinusoidally from 100% to about 0% and thence increase again to 100% with the increase in the elongation length $\Delta\lambda$ as shown in FIG. 2. It is therefore reasonable to approximate the functional equation representing the branching ratio y of the optical fiber coupler as a function of the elongation length $\Delta\lambda$ in at least that portion of the curve along which the branching ratio decreases. An example of such an approximation is as follows:

$$y = \sin^2\{f(\Delta\lambda)\} \qquad (1)$$

In the above, $f(\Delta\lambda)$ is a polynominal of the elongation length $\Delta\lambda$. The polynominal $f(\Delta\lambda)$ is determined on the basis of the measured data $y_1$, $y_2$, ... and $\Delta\lambda_1$, $\Delta\lambda_2$, ...

Step (5): The above functional equation (1) which represents the branching ratio y, containing the polynominal $f(\Delta\lambda)$, is used to calculate the value of an elongation length $\Delta\lambda_m$ which provides the intended branching ratio $y_m$ of the optical fiber coupler.

Step (6): The fusion-welded portion of the optical fibers 12A and 12B is heated again by the burner 13, and at the same time, the mount 11B is pulled by the driver 14 with constant force. When the elongation length reaches the above-mentioned value $\Delta\lambda_m$, the sliding movement of the mount 11B by the driver 14 is stopped, and at the same time, heating of the optical fibers 12A and 12B is stopped. After the temperature of the fusion-welded portion of the optical fibers drops down to room temperature, the branching ratio is measured and the operation comes to an end after making sure that the measured value is within the limits of predetermined error of the branching ratio $y_m$ desired to obtain.

The sequence of Steps (1) through (6) are performed by the controller 20 under preset program control.

FIG. 2 is a graph showing two points of measurement of the elongation length and the branching ratio, ($\Delta\lambda_1$, $y_1$) and ($\Delta\lambda_2$, $y_2$), during the actual manufacture of the optical fiber coupler by performing the Steps (1) through (6) and a curve representing the functional equation obtained through approximate calculation based on the measured data. Using equations $y_1 = \sin^2\{f(\Delta\lambda_1)\}$ and $y_2 = \sin^2\{f(\Delta\lambda_2)\}$ obtained by substituting data at the two point of measurement into the aforementioned functional equation (1), the polynominal $f(\Delta\lambda)$ was approximated as follows:

$$f(\Delta\lambda) = 0.07666(\Delta\lambda - 3.973)^2 \qquad (2)$$

That is, the functional equation (1) was determined as follows:

$$y = \sin^2\{(0.0766(\Delta\lambda - 3.973)^2\} \qquad (3)$$

In Step (5), the elongation length $\Delta\lambda$ obtained by solving Eq. (3) for the intended branching ratio $y_m$ of the optical fiber coupler set to 0.5 was 7.173 mm. In Step (6) the heat elongation of the optical fibers was stopped when the elongation length reached 7.173 mm, and the branching ratio measured at that time was accurate to ±5 percent of the intended value.

While in the above such a sine function as shown in Eq. (1) is used as the functional equation representing the relationship between the elongation length and the branching ratio, it is also possible to use any other suitable functional equation represented by $y = g(\Delta\lambda)$. Furthermore, in the above example the heat elongation was stopped when the fusion-welded portion of the optical fibers was elongated to a desired length and then the performance of the optical fiber coupler was measured after the temperature of the fusion-welded portion dropped to room temperature. It is also possible, however, to employ a method in which in Step (2) and (3) the performance of the optical fiber coupler, for example, a branching ratio z during heat elongation, is measured at a desired elongation length without interrupting the heat elongation and in Step (4) the branching ratio y of the optical fiber coupler at room temperature is approximated by a desired function $y = k(z, \Delta\lambda)$ of the elongation length $\Delta\lambda$ on the basis of the elongation length data $\Delta\lambda_1$, $\Delta\lambda_2$, ... and the branching ratios $z_1$, $z_2$, ... Alternatively, the branching ratio y may be approximated by a recurrence formula represented by:

$$y_n = h\{y_{n-1}(z,\Delta\lambda), y'_{n-1}(z,\Delta\lambda)\}, \; n=1, 2, ...$$

In the above, h is a suitable functional equation and y' is a differential coefficient of the branching ratio y. Although the present invention has been described as being applied to the manufacture of an optical fiber coupler of a desired branching ratio characteristic, the invention is applicable as well to the fabrication of optical fiber couplers of other performance.

As described above, according to the present invention, the functional equation for approximating the relationship between the elongation length and the performance of the optical fiber coupler is determined after heat elongation of the fusion-welded portion of optical fiber and measurement of its performance are carried out at least once, the functional equation is used to calculate the elongation length which provides the intended performance, and then the fusion-welded portion of the optical fiber is elongated to the calculated length, whereby the optical fiber coupler having the intended performance is manufactured. Hence the number of manufacturing steps involved is small, and consequently, the time for manufacture is short.

It will be apparent that many modifications and variations may be effected without departing from the scope of the novel concepts of the present invention.

What is claimed is:

1. A method for the manufacture of an optical fiber coupler by fusion welding at least two optical fibers, comprising the steps of:

fusion welding at least two optical fibers to form coupled optical fibers;

heat elongating said coupled optical fibers;

measuring a performance of said coupled optical fibers at a desired elongation length;

repeating said heat elongating step and said measuring step at least twice for different elongation lengths;

determining a functional equation representing a relationship between said elongation length and said performance of said coupled optical fibers, through approximate calculation based on measured values of the performance;

calculating from said functional equation an elongation length which provides an intended performance of said coupled optical fibers; and heat elongating said coupled optical fibers to said calculated elongation length to obtain said optical fiber coupler.

2. The method of claim 1 wherein said performance of said coupled optical fibers is measured after said heat-elongated optical fibers are cooled substantially to room temperature.

3. The method of claim 1 wherein said performance of said coupled optical fibers is measured during heat elongation of said coupled optical fibers.

4. The method of claim 2 or 3 wherein said step of measuring said performance of said coupled optical fibers involves measurement of the quantity of light emitted from at least one of said optical fibers during their heat elongation and said performance of said coupled optical fibers is measured after said quantity of light emitted changes by a predetermined value.

5. The method of claim 1 or 2 wherein said performance of said coupled optical fibers is a branching ratio and said functional equation is represented by $y = \sin^2\{f(\Delta\lambda)\}$, where y is said branching ration, $\Delta\lambda$ is said elongation length, and f is an arbitrary polynominal.

* * * * *